(12) United States Patent
Cattaneo et al.

(10) Patent No.: US 7,736,719 B2
(45) Date of Patent: Jun. 15, 2010

(54) PROTECTION PANEL FOR AIRCRAFTS

(75) Inventors: Giuliano Cattaneo, Seveso Milan (IT); Luca Bottero, Varese (IT)

(73) Assignee: Alenia Aermacchi S.p.A., Venegono Superiore (Varese) (IT)

( * ) Notice: Subject to any disclaimer, the term of this patent is extended or adjusted under 35 U.S.C. 154(b) by 0 days.

(21) Appl. No.: 12/001,148

(22) Filed: Dec. 10, 2007

(65) Prior Publication Data

US 2008/0145618 A1    Jun. 19, 2008

(30) Foreign Application Priority Data

Dec. 14, 2006    (IT)    .......................... MI2006A2408

(51) Int. Cl.
- B32B 3/00 (2006.01)
- B32B 3/14 (2006.01)
- B32B 3/16 (2006.01)
- B32B 23/02 (2006.01)
- B64C 1/10 (2006.01)
- B64D 7/00 (2006.01)

(52) U.S. Cl. .................. 428/157; 428/192; 428/60; 428/78; 428/77; 428/172; 244/121

(58) Field of Classification Search ............... 428/171, 428/172, 192, 354, 99, 60, 81, 156, 157, 428/77, 78; 244/119–121, 133
See application file for complete search history.

(56) References Cited

U.S. PATENT DOCUMENTS

| | | | |
|---|---|---|---|
| 3,891,996 A * | 7/1975 | Leach et al. | ........... 2/2.5 |
| 3,974,313 A | 8/1976 | James | |
| 5,102,723 A | 4/1992 | Pepin | |
| 5,343,796 A | 9/1994 | Cordova | |
| 6,238,768 B1 * | 5/2001 | Van de Goot | ........... 428/113 |
| 2004/0144244 A1 | 7/2004 | Sargent | |
| 2007/0079920 A1 * | 4/2007 | Holland | ........... 156/98 |

FOREIGN PATENT DOCUMENTS

| | | | |
|---|---|---|---|
| EP | 0 906 977 A | | 4/1999 |
| GB | 2130073 A | * | 5/1984 |
| GB | 2 159 886 A | | 12/1985 |

OTHER PUBLICATIONS

EP Search Report Dated Apr. 18, 2008.

* cited by examiner

*Primary Examiner*—David R Sample
*Assistant Examiner*—Catherine Simone
(74) *Attorney, Agent, or Firm*—Hedman & Costigan, P.C.; James V. Costigan

(57) ABSTRACT

Protection panel (3) for an aircraft suitable for being associated with at least a portion of the surface to be protected, consisting of a plurality of layers associated with each other made of aramid fibre in which at least one of said layers consists of an aramid fibre or unidirectional fabric.

6 Claims, 3 Drawing Sheets

PROTECTION PANEL FOR AIRCRAFTS

BACKGROUND OF THE INVENTION

The present invention relates to a protection panel for aircrafts.

In particular, the present invention relates to a protection panel for engines or other critical aircraft components suitable for the absorption of impact with fragments for example metallic having a high kinetic energy which could cause a catastrophic breakage of one or more components of another engine of the aircraft.

The ever-increasing use of twin-engine aeroplanes even on long-range lines makes it fundamental to protect engines or other critical components from impact with splinters expelled from the other engine due to the breakage of moving mechanical organs.

Traditional solutions use metallic protections installed directly on the engine for this purpose.

These traditional solutions mainly have the disadvantage of being heavy, costly and obstructing maintenance operations.

The Applicant has faced the problem of simply, effectively and economically protecting engines from damage due to interferences with objects, for example projected towards the fan cowl of the engine itself by the breakage of another engine of the aircraft.

In particular, the solution found envisages that on the fan cowl of the engine or plating adjacent to other critical components, a multilayer panel be installed having at least one layer of fabric or unidirectional made of aramid fibre. The various layers can be bound to each other by means of a resin which should then be polymerized according to a specific treating cycle on a suitable mould, or by sewing the various layers together.

SUMMARY OF THE INVENTION

An aspect of the present invention relates to a protection panel for an aircraft suitable for being associated with at least a portion of the surface to be protected, characterized in that it comprises a plurality of layers associated with each other made of aramid fibre in which at least one of said layers consists of an aramid fibre or unidirectional fabric.

BRIEF DESCRIPTION OF THE DRAWINGS

Further advantages and objectives of the present invention will appear evident from the following description and enclosed drawings, provided for purely illustrative and non-limiting purposes, wherein.

DETAILED DESCRIPTION OF THE INVENTION

Figure 1A:
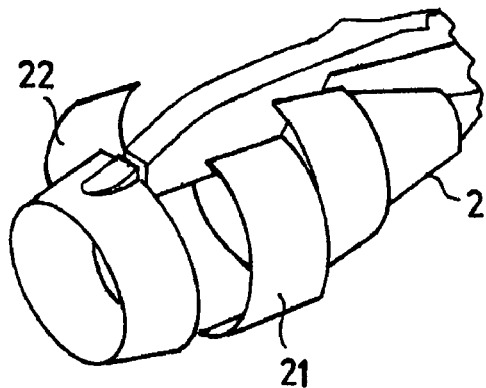
FIG. 1a represents a schematic view of an aircraft engine.

With reference to the above figures, the engine body 2 of an aircraft is in the form of an oblong casing having inside the turboreactor with all its elements, such as for example, the turbine, the compressor and the combustion chamber. In the aeronautical field the supporting structure of the engine or its casing is conventionally called "nacelle" and has at least one openable portion, through which it is possible to have access to all the internal elements of the engine. FIG. 1A shows a casing 2 having an opposite pair of openable portions 21 and 22 positioned in front of each other with respect to the longitudinal axis of the casing.

Figure 1B:
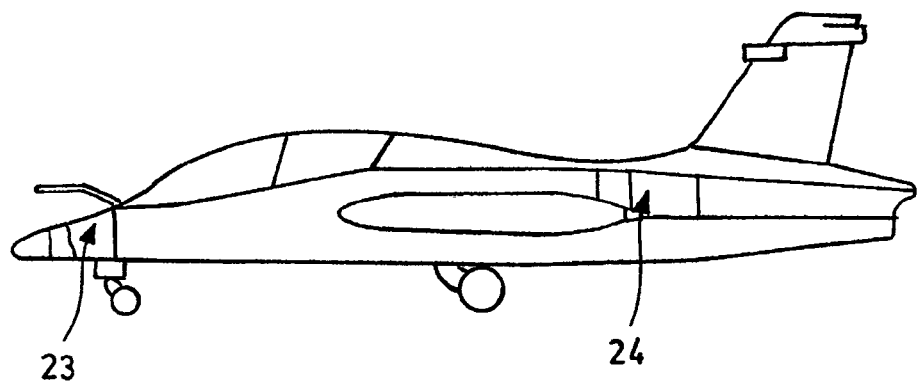
FIG. 1b schematically represents the fuselage of an aircraft.

FIG. 1B representing an aircraft, illustrates two portions of casing 23 and 24 situated in correspondence with critical components.

Figure 2A:
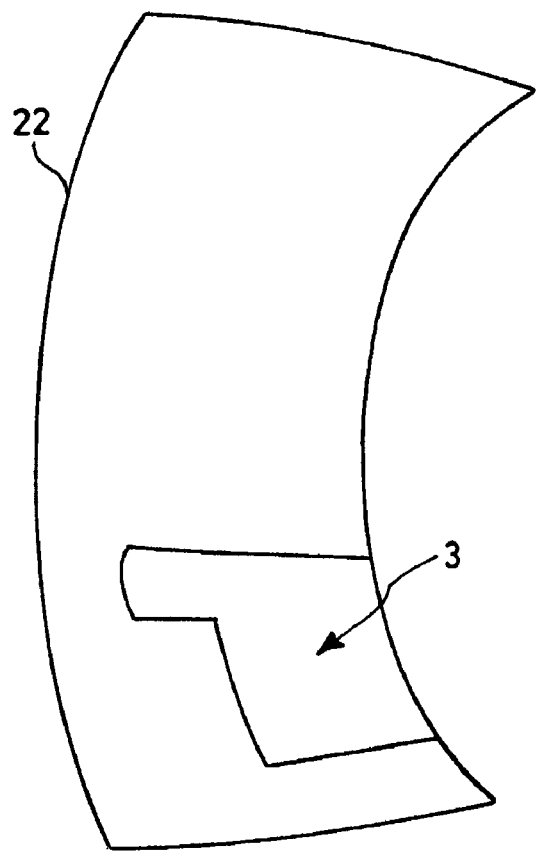
FIG. 2a is a schematic view of a portion of the hood of the engine on which the panel according to the present invention is applied.
Figure 2B:
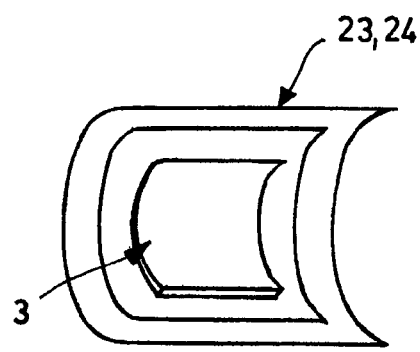
FIG. 2b is a schematic view of a portion of fuselage plating on which the panel according to the present invention is applied.

These openable portions and other portions of the internal surface of the nacelle of the engine or fuselage can be covered with the panel according to the present invention. FIG. 2A for example illustrates one of the two openable portions 22 partially covered internally by a panel 3 produced according to the present invention; FIG. 2B illustrates one of the two portions 23 or 24 partially covered internally by a panel 3 produced according to the present invention. The panel 3 can cover plating areas, for example of the fuselage in correspondence with critical components or power generation units (APU) for the containment of splinters due to breakage of a moving component.

The panel 3 substantially comprises a plurality of layers associated with each other made of aramid fibre. At least one of these layers consists of an aramid fibre or unidirectional fabric.

The aramid fibre is an aromatic polyamide fibre generally used as reinforcement of plastic materials in the production of high-quality composites (for competition canoes, bulletproof jackets, protective helmets, etc.).

The various layers are bound to each other for example by means of a resin which should then be polymerized according to a specific treatment cycle on a suitable mould, or by sewing the various layers together.

Figure 3:
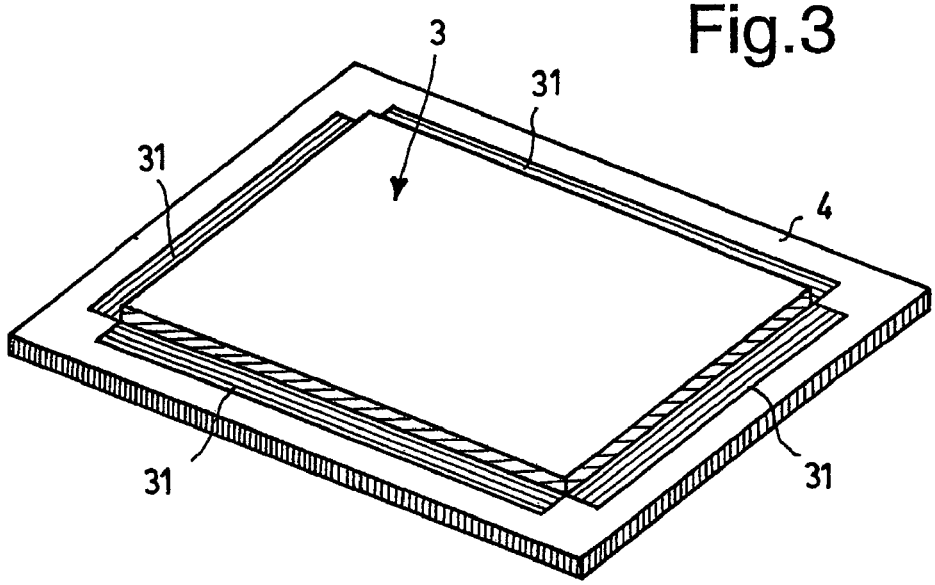
FIG. 3 is a schematic perspective view of a panel according to the present invention.
Figure 4:
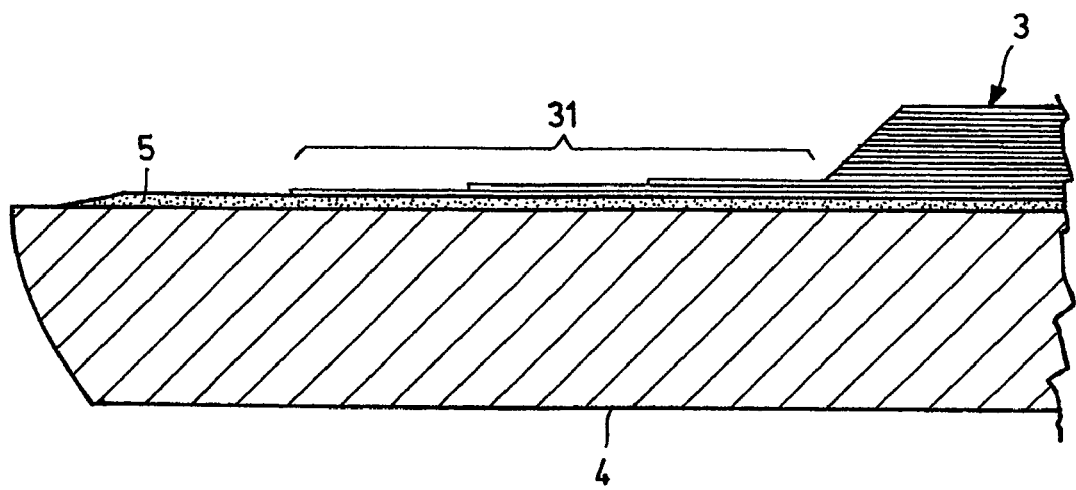
FIG. 4 is a section of a detail of the edge of the panel according to the present invention.

FIGS. 3 and 4 illustrate an embodiment example of said panel positioned on a flat support 4 which simulates the internal surface of the nacelle of the engine, in which the various layers are arranged so that the panel can be stepped 31 in its perimetric area, which is advantageous with respect to the ratio between the performances and weights of the panel 3. On the perimetric area, the panel can also have a strap, for example metallic, which covers the aramid layer. Mechanical connection elements of the panel to the surface to be covered can also be advantageously envisaged on the perimetric layer. The installation of the panel can generally be effected by gluing (as illustrated in FIG. 4 which shows a layer of glue 5), the use of mechanical connection elements, velcro or any other system which, alone or in collaboration with those mentioned, is capable of holding the protection panel in position.

The advantages offered by the solution proposed consist in both an improvement in the weight/efficacy and cost/efficacy ratio with respect to the conventional metal solutions. Further advantages are the increased accessibility to parts of the propeller or other critical components in the maintenance phases, if the panels are installed on the openable portions. Said panel is in fact significantly lighter, economical and versatile than the equivalent traditional solutions used so far.

The total sealing of the edges and exposed surface of the ballistic panel completes the production phase and guarantees insulation of the panel from aggressive and atmospheric agents.

The solution proposed is completely passive and does not at all influence the structural aspects of the component to which it is applied.

The invention claimed is:

1. A protection panel (3) for an aircraft suitable for being associated with at least a portion of a surface to be protected, characterized in that the protection panel comprises a plurality of layers associated with each other in which at least one of said layers consists of an aramid fibre, the layers being arranged so that the panel is stepped (31) in a perimetric area in which mechanical connections to said aircraft are provided and wherein the panel also has a strap on said perimetric area.

2. The protection panel according to claim 1, wherein the layers are bound to each other by means of a resin.

3. The protection panel according to claim 1, wherein the layers are bound to each other by means of sewing.

4. The protection panel according to claim 1, characterized in that the protection panel is glued onto a surface to be covered.

5. The protection panel according to claim 1, wherein the protection panel is associated with an internal surface of openable portions (21, 22) of a fan cowl (2) of an engine or other critical components (23, 24)

6. The protection panel according to claim 1, wherein said at least one layer is an unidirectional fabric.

* * * * *